US012794145B2

(12) United States Patent
Bayat-Makou et al.

(10) Patent No.: US 12,794,145 B2
(45) Date of Patent: Nov. 10, 2026

(54) PHASED-ARRAY MILLIMETER-WAVE ANTENNA ASSEMBLIES AND ANTENNA ELEMENTS

(71) Applicant: PERASO TECHNOLOGIES INC., Toronto (CA)

(72) Inventors: Nima Bayat-Makou, Thornhill (CA); Atabak Rashidian, Richmond Hill (CA); Mihai Tazlauanu, Markham (CA)

(73) Assignee: PERASO TECHNOLOGIES INC., Toronto (CA)

( * ) Notice: Subject to any disclaimer, the term of this patent is extended or adjusted under 35 U.S.C. 154(b) by 0 days.

(21) Appl. No.: 18/907,016

(22) Filed: Oct. 4, 2024

(65) Prior Publication Data

US 2025/0118903 A1 Apr. 10, 2025

Related U.S. Application Data

(60) Provisional application No. 63/588,064, filed on Oct. 5, 2023.

(51) Int. Cl.
*H01Q 21/06* (2006.01)
*H01Q 1/22* (2006.01)

(52) U.S. Cl.
CPC ......... *H01Q 21/065* (2013.01); *H01Q 1/2275* (2013.01)

(58) Field of Classification Search
CPC ............................ H01Q 21/065; H01Q 1/2275
See application file for complete search history.

(56) References Cited

U.S. PATENT DOCUMENTS 4,370,657 A * 1/1983 Kaloi .................. H01Q 19/005 343/729
2019/0288402 A1* 9/2019 Rashidian ................ H01Q 1/38

* cited by examiner

*Primary Examiner* — Graham P Smith
(74) *Attorney, Agent, or Firm* — Perry + Currier Inc.

(57) ABSTRACT

A radio frequency module, comprising: a primary board; a controller supported by the primary board; and an antenna assembly supported by the primary board and connected with the controller, the antenna assembly including: an array of antenna elements, each antenna element having: an active patch; and a passive patch separated from the active patch by a slot; wherein one of the active patch and the passive patch has a greater surface area than the other of the active patch and the passive patch.

10 Claims, 5 Drawing Sheets

PHASED-ARRAY MILLIMETER-WAVE ANTENNA ASSEMBLIES AND ANTENNA ELEMENTS

CROSS-REFERENCE TO RELATED APPLICATION

This application claims priority from U.S. provisional patent application No. 63/588,064, filed Oct. 5, 2023 and entitled "Wide-Band MM-Wave Low Profile PCB Integrated Phased Array Antenna", the contents of which is incorporated herein by reference.

FIELD

The specification relates generally to wireless communications, and specifically to phased-array antenna assemblies and elements thereof.

BACKGROUND

Wireless antenna assemblies such as phased arrays are subject to competing constraints, such as performance targets and cost and/or complexity of manufacturing.

SUMMARY

Examples disclosed herein are directed to radiofrequency (RF) module, comprising: a primary board; a controller supported by the primary board; and an antenna assembly supported by the primary board and connected with the controller, the antenna assembly including: an array of antenna elements, each antenna element having: an active patch; and a passive patch separated from the active patch by a slot; wherein one of the active patch and the passive patch has a greater surface area than the other of the active patch and the passive patch.

BRIEF DESCRIPTIONS OF THE DRAWINGS

Embodiments are described with reference to the following figures.

DETAILED DESCRIPTION

Figure 1A:
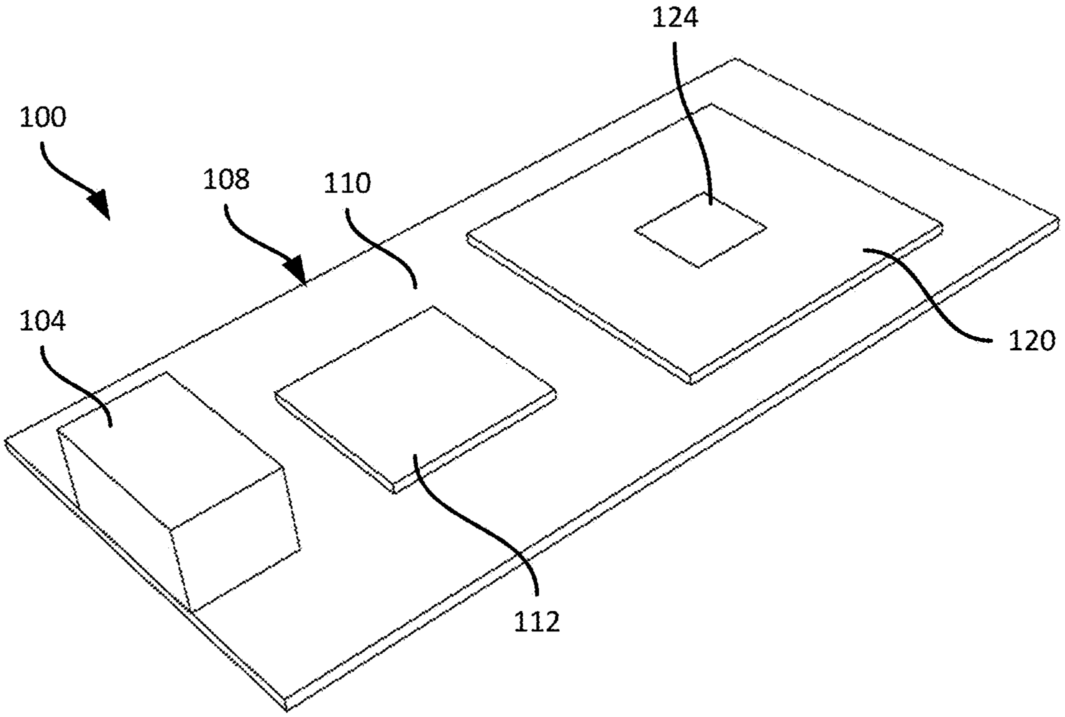
FIGS. 1A and 1B depict perspective views of a radio frequency module, from above and below.

FIG. 1A depicts an example wireless communications module 100, also referred to as a radio frequency (RF) module 100 or simply the module 100. The module 100, in general, is configured to enable wireless data communications between computing devices (not shown). In the present example, the wireless data communications enabled by the module 100 are conducted according to the Institute of Electrical and Electronics Engineers (IEEE) 802.11 family of standards, including the 802.11ad, 802.11ay, and related standards, which may also referred to as WiGig. That is, the module 100 can enable wireless communications using frequencies of about 57 GHz to about 71 GHz (e.g., across six channels, each with a bandwidth of about 2 GHZ). As will be apparent, however, the module 100 may also enable wireless communications according to other suitable standards, employing other frequency bands.

Antenna assemblies for wireless communications may be subject to competing constraints. For example, although wireless communications using frequencies around 60 GHz may permit significantly higher throughput than communications using lower frequencies, WiGig-based communications are also subject to greater signal losses due to environmental obstacles, transmission distance, and the like.

To realize the theoretical performance gains of WiGig relative to lower-frequency wireless communications, antenna assemblies may be required to provide higher gain that antenna assemblies used for other wireless communication standards. Further, antenna assemblies used for WiGig communications that cannot provide sufficient gain over the significant channel bandwidth of the 60 GHz band (e.g., about 12 GHz of bandwidth across six channels) may provide suboptimal performance, potentially obviating the theoretically increased throughput of WiGig communications.

Achieving the above design goals (e.g., high gain, and wide band coverage) may increase the complexity of antenna elements. Increased complexity, particularly when antenna elements are integrated into printed circuit board (PCB) stack-ups, may involve increase the number of layers in a board, which can increase the cost of fabrication. Wireless communication modules may produced in large volume and may be highly cost sensitive, and the additional layers and/or tight manufacturing tolerances involved in producing antenna assemblies with acceptable performance parameters may therefore be untenable.

As discussed below, the module 100 includes an antenna assembly that provides sufficient gain over a sufficient portion of the 60 GHz frequency band to realize at least a portion of the potential improvements in throughput contemplated by the standards mentioned above. As will be apparent, the antenna assembly described herein may also be used for other forms of wireless communication, e.g., at frequencies around 2.4 GHz, 5 GHZ, or the like. Further, the antenna assemblies described herein can be accommodated in a relatively small number of PCB layers (e.g., one or two layers for the radiative elements), and may therefore mitigate some of the cost and/or complexity issues noted above.

Figure 1B:
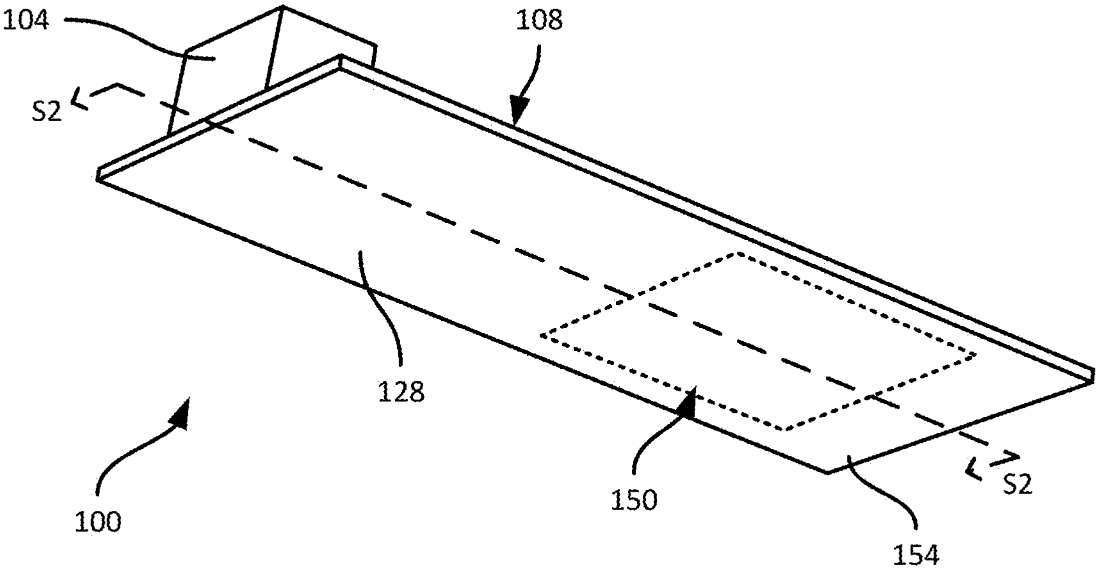

The module 100 can be integrated with a computing device, or in other examples as shown in FIGS. 1A and 1B, can be implemented as a discrete device that is removably connected to a computing device. In examples in which the module 100 is configured to be removably connected to a computing device, the module 100 includes a communications interface 104, such as a Universal Serial Bus (USB) port, configured to connect the remaining components of the module 100 to a host computing device (not shown).

The module 100 includes a primary board 108, which may also be referred to as a primary support. In the present example, the primary board 108 is a printed circuit board (PCB), for example fabricated with FR4 material, carrying either directly or via additional boards, the remaining components of the module 100. In particular, the primary board 108 carries, e.g. on an upper surface 110 thereof, the above-mentioned communications interface 104. The upper surface 110 is referred to as "upper" to distinguish from the opposing surface, to be discussed below, and does not indicate a required orientation of the module 100 in use.

The primary board 108 also carries, on the upper surface 110, a baseband controller 112. The baseband controller 112 is implemented as a discrete integrated circuit (IC) in the present example, such as a field-programmable gate array (FPGA). In other examples, the baseband controller 112 may be implemented as two or more discrete components. In further examples, the baseband controller 112 can be integrated within the primary board 108 (i.e. be defined within the conductive layers of the primary board 108) rather than carried on the upper surface 110.

In the present example, the baseband controller 112 is connected to the primary board 108 via any suitable surface-mount package, such as a ball-grid array (BGA) package that electrically couples the baseband controller 112 to signal paths (also referred to as leads, traces and the like) formed within the primary board 108 and connected to other components of the module 100. For example, the primary board 108 defines signal paths (not shown) between the baseband controller 112 and the communications interface 104. Via such signal paths, the baseband controller 112 transmits data received at the module 100 to the communications interface for delivery to a host computing device, and also receives data from the host computing device for wireless transmission by the module 100 to another computing device. Further, the primary board 108 defines additional signals paths extending between the baseband controller 112 and further components of the module 100, to be discussed below.

The module 100 further includes an interposer 120 carrying a radiofrequency (RF) controller 124. The interposer 120 is a discrete component mounted on the first surface 110 via a suitable surface-mount package (e.g., BGA). The interposer 120 carries the RF controller 124, and contains signal paths (also referred to as feed lines) for connecting control ports of the RF 124 to the baseband controller 112, and for connecting further control ports of the RF controller 124 to antenna elements to be discussed in greater detail below. The RF controller 124 may, for example, be placed onto or into the interposer 120 via a pin grid array or other suitable surface-mount package. In other examples, the RF controller 124 may be mounted directly on the first surface 110, e.g., via a BGA package, rather than being supported by the interposer 120.

The module 100 may include a heatsink (not shown) placed over the baseband controller 112, the interposer 120 and the RF controller 124, and in contact with upper surfaces of those components, e.g. to exhaust heat generated by the components. In other examples, separate heat sinks may be placed over the baseband controller 112, and the combination of the interposer 120 and RF controller 124.

The RF controller 124 includes a transmitting port and a receiving port for connection, via the interposer 120 and traces defined by the primary board 108, to the baseband controller 112. The RF controller 124 also includes a plurality of antenna ports for connection, via the interposer 120, to corresponding radio control contacts on the upper surface 110 of the primary board 108. Those contacts, in turn, are connected to elements on the opposing lower surface of the primary board 108, to carry signals between the RF controller 124 and the above-mentioned antenna elements.

FIG. 1B shows a lower surface 128 of the primary board 108, opposite the upper surface 110. The above-mentioned antenna elements, such as a phased array of sixty-four antenna elements (other arrangements of antenna elements are also contemplated), are components of an antenna assembly 150 integrated with the board 108, e.g., disposed at or adjacent to the lower surface 128. That is, the antenna assembly 150 may occupy at least a portion of the exterior layer of the board 108 at the lower surface 128, and/or at least a portion of the next one to three layers of the board 108, beginning from the lower surface 128. In other examples, the antenna assembly 150 can be implemented on a separate, secondary board (not shown) that is coupled to the primary board 108.

Figure 2:
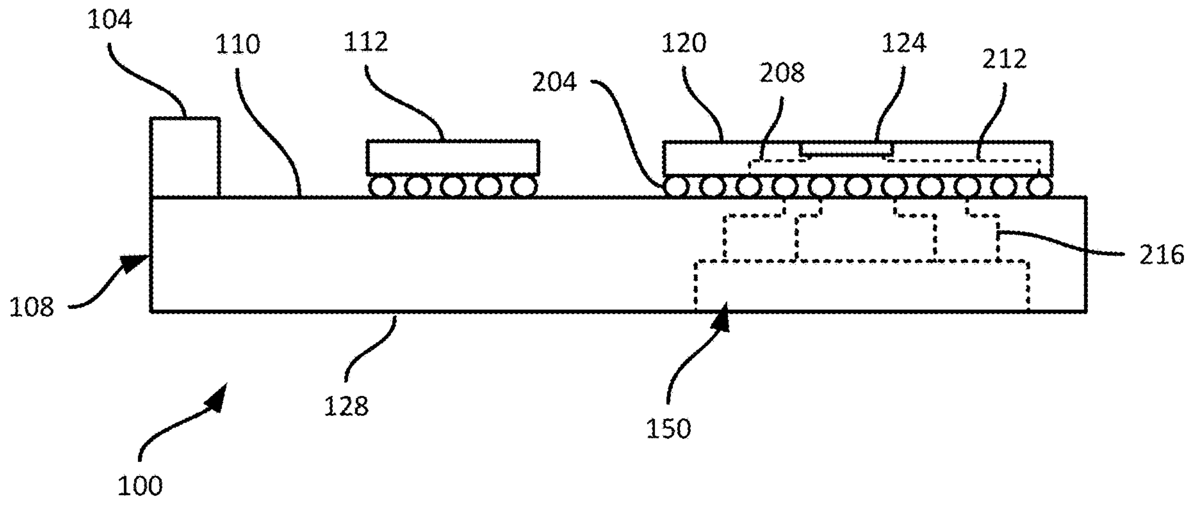
FIG. 2 depicts a cross-section of the module of FIG. 1B.

Turning to FIG. 2, the cross-section S2-S2 indicated in FIG. 1B is illustrated. As seen in FIG. 2, the interposer 120 is connected to the upper surface 110 via a surface-mount package 204, which in the present example is a BGA package. The interposer 120 contains a plurality of internal feed lines, examples 208 and 212 of which are shown in FIG. 2, connecting control ports of the radio controller 124 to elements of the package 204 for electrical connection with control contacts on the upper surface 110. At least a portion of the control contacts on the upper surface 110 are connected to conduits extending through the primary board 108 from the upper surface 110 to the lower surface 128. The conduits 216 form a feed network to convey signals from the RF controller 124 to antenna elements of the antenna assembly 150.

Figure 3:
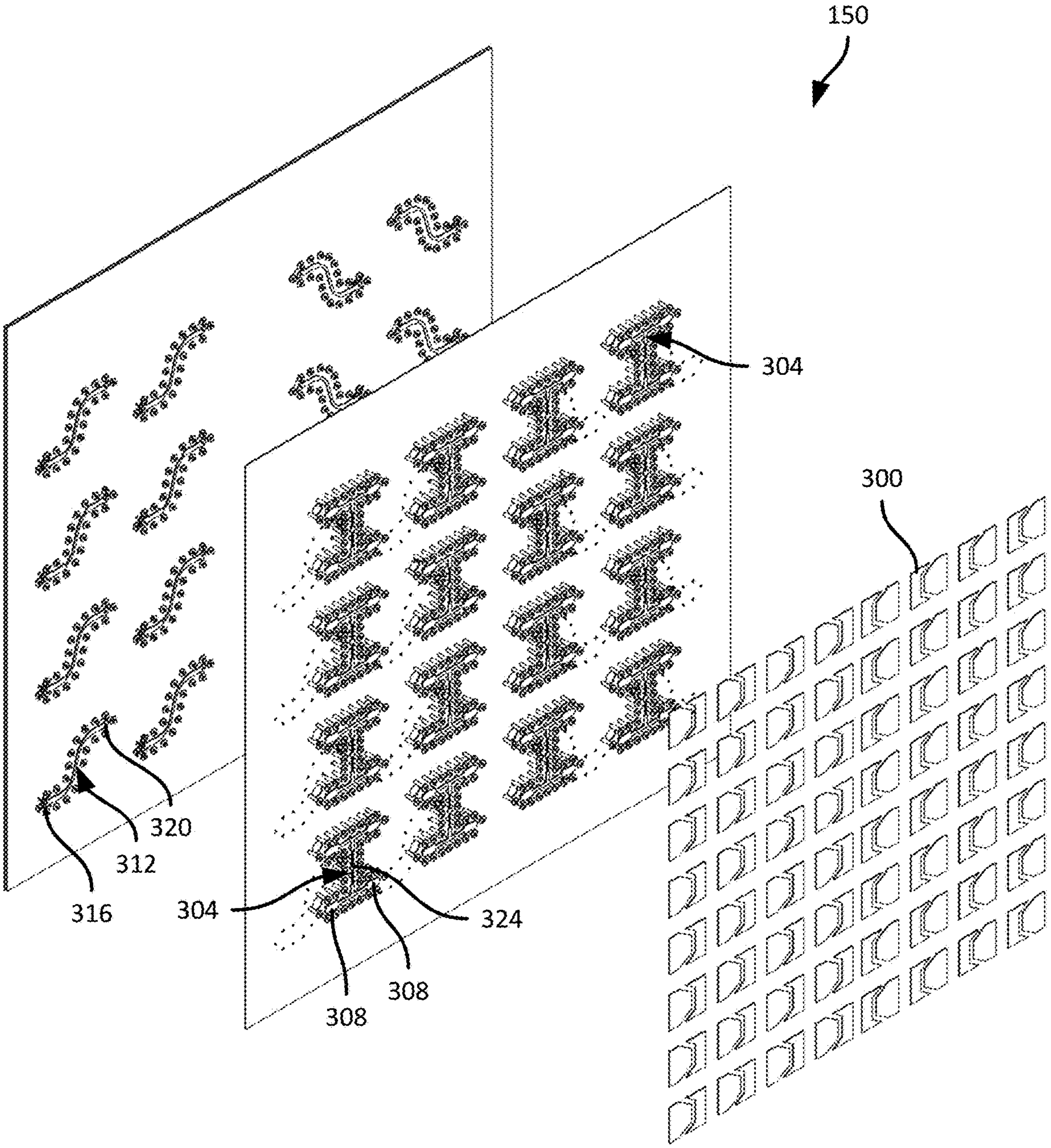
FIG. 3 is a diagram showing an exploded view of an antenna assembly of the module of FIGS. 1A and 1B.

Turning to FIG. 3, certain components of the antenna assembly 150 are shown in an exploded view. Certain portions of the antenna assembly 150, such as some layers of dielectric material, ground planes, and the like, are omitted from FIG. 3 for clarity.

The assembly 150 includes a plurality of antenna elements 300, e.g., arranged in grid-like array. In this example, the array includes sixty-four antenna elements 300, e.g., in an 8×8 configuration. A wide variety of other array configurations can also be employed, e.g., depending on the performance parameters targeted by the assembly 150, and/or the physical space available for the assembly 150. The structural features of the antenna elements 300 are discussed in further detail in connection with FIG. 4.

The assembly 150 also includes a plurality of subarray dividers 304, each including four terminals or excitation points 308. Each excitation point 308 is configured to connect (e.g., with a via or the like) to one of the antenna elements 300. Each subarray divider 304, in this example, connects to four antenna elements 300 (e.g., in a 2×2 subarray). The use of the subarray dividers 304 permits the RF controller 124 to control a plurality of antenna elements 300 simultaneously. That is, the RF controller 124 in this example can implement sixteen control ports, each driving four antenna elements 300. Simultaneously controlling a group of antenna elements 300 may reduce the degree to which the array as a whole can be steered, but also mitigates the complexity of controlling the antenna elements 300 individually. In other examples, the subarrays can include more than four antenna elements 300. In further examples, the subarray dividers 304 can be omitted, and the RF controller 124 can be configured to control each antenna element 300 individually.

The assembly 150 further includes a plurality of subarray signal lines 312. The subarray signal lines 132 can be terminal components of the feed network 216, for example, and carry control signals between the RF controller 124 and the antenna elements 300 (via the subarray dividers 304, in this example). Each signal line 312 includes a first end 316, configured to connect to a portion of the feed network 216, and a second end 320 configured to connect to an excitation point 324 of a corresponding subarray divider 304.

Figure 4A:
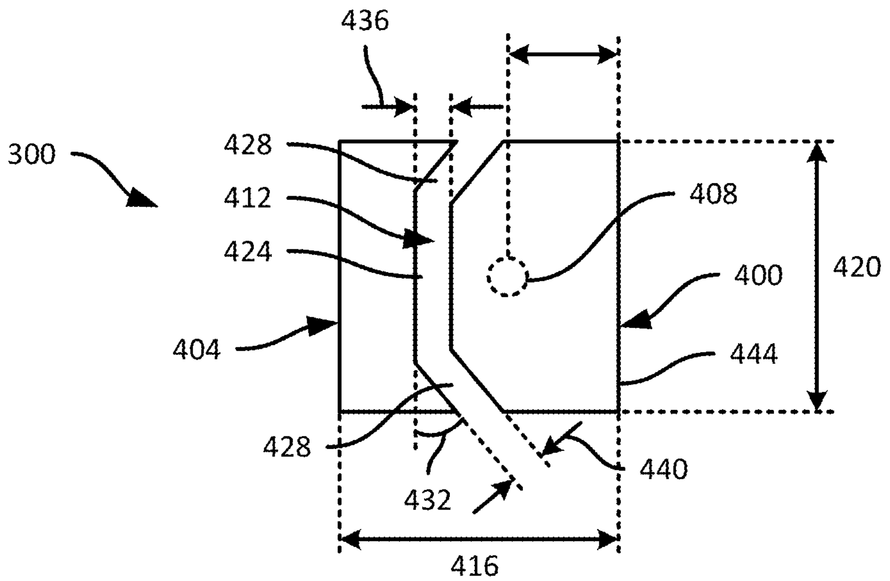
FIG. 4A is a diagram of an antenna element of the assembly of FIG. 3.

Turning to FIG. 4A, an example antenna element 300 is shown in isolation. The antenna element 300 includes an active patch 400, and a passive patch 404. The active patch 400 includes a contact region 408 configured to connect the patch 400 with a corresponding excitation point 308. The passive patch 404 is electromagnetically coupled with the active patch 400, and therefore radiates when power is supplied to the patch 400, but does not have a physical connection to the feed network 216.

The patches 400 and 404 are unequally sized. As shown in this example, the active patch 400 has a larger surface area than the passive patch 404. In other examples, as discussed further below, the passive patch can have a larger surface area than the active patch.

The active patch 400 and the passive patch 404 are separated by a slot 412. The slot 412, and the shapes of the patches 400 and 404, can have various configurations. The patches 400 and 404 define a rectangular perimeter that encompasses both patches 400 and 404, e.g., having a perimeter length 416 and a perimeter width 420. The patches 400 and 404 have at least one colinear edge. That is, the patch 400 has at least one edge that is colinear with a corresponding edge of the patch 404. In this example, the patches 400 and 404 each have two colinear edges (the upper and lower, edges, in the orientation shown in FIG. 4A).

Figure 4B:
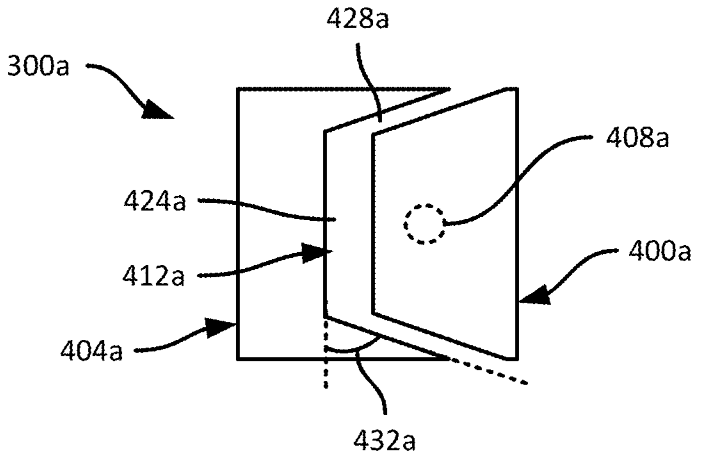
FIG. 4B is a diagram of another example antenna element.

In the example shown in FIG. 4A, the slot 412 extends from one side of the perimeter mentioned above to an opposite side of the perimeter. The slot 412 includes a central portion 424, which is substantially parallel to a pair of edges of the rectangular perimeter. The slot 412 also includes an outer portion that is non-parallel to the above edges. In this example, the slot 412 includes two outer portions 428, symmetrically disposed at either end of the central portion 424 and each at an angle 432 relative to the central portion 424 (and therefore also relative to the above-mentioned edges of the rectangular perimeter). The angle, in this example, is about 40 degrees. A wide variety of other angles are also contemplated for the outer portions 428. For example, as shown in FIG. 4B, another example antenna element 300*a* includes patches 400*a* (active, as indicated by the contact region 408*a*) and 404*a* (passive), separated by a slot 412*a* having a central portion 424*a* and outer portions 428*a* that are at angles 432*a* of about 70 degrees relative to the central portion 424*a*.

A width 436 of the central portion 424, a width 440 of the outer portions 428, the perimeter width 420 and perimeter length 416, can be tuned according to the performance demands of the application(s) in which the assembly 150 is to be deployed. Other parameters that can be tuned for a given implementation include a length of the central portion 412, a distance between the contact region 408 and an edge 444 of the patch 400. The assembly 150 can also include vias surrounding the antenna elements 300 and/or the subarray dividers 304 and/or the subarray signal lines 312, as seen in FIG. 3, and the distance between edges of the element 300 and adjacent vias may also be tuned to optimize antenna performance.

Figure 5A:
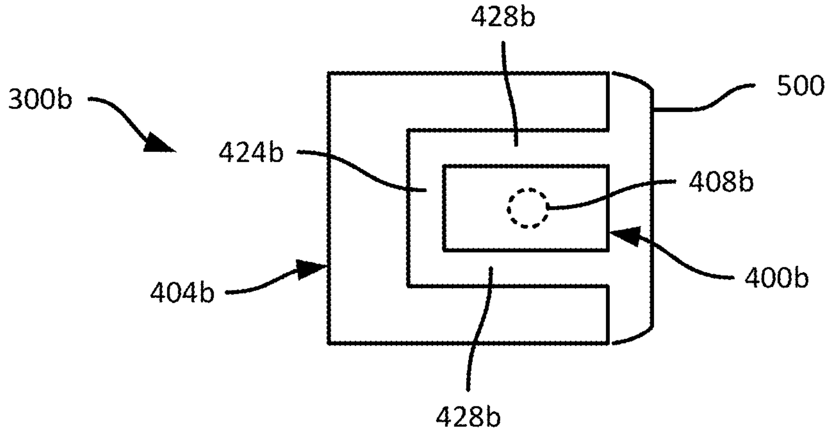
FIG. 5A is a diagram of another example antenna element.

FIG. 5A illustrates a further example antenna element 300*b* with an active patch 400*b* having a contact region 408*b*, and a passive patch 404*b*. In this example, the active patch 400*b* has a smaller surface area than the passive patch 404*b*. The patches 400*b* and 404*b* are separated by a slot 412*b* with a central portion 424*b* and outer portions 428*b*. As seen in FIG. 5A, the outer portions 428*b* are substantially perpendicular to the central portion 424*b*, and the slot 412 therefore does not extend from one side of the rectangular perimeter to an opposite side, but rather extends from a first portion of one side 500 of the rectangular perimeter to another portion of the same side 500.

Figure 5B:
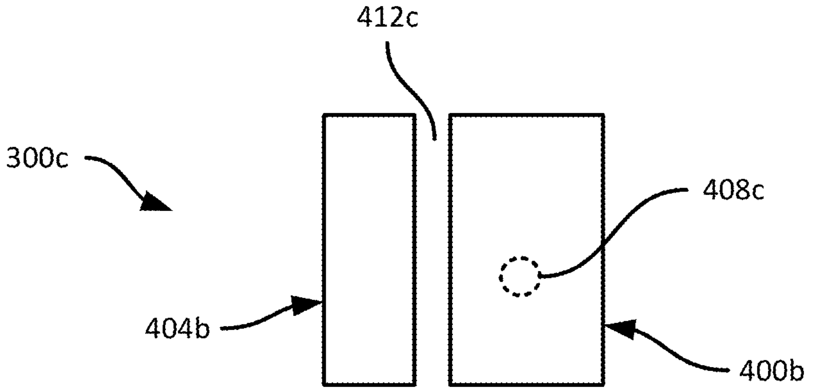
FIG. 5B is a diagram of another example antenna element.

FIG. 5B illustrates another example antenna element 300*c* with an active patch 400*c* having a contact region 408*c*, and a passive patch 404*c*, separated by a slot 412*c*. As will be apparent, in the embodiment of FIG. 5C, the slot 412*c* does not include angled outer portions, but is instead a single continuous segment, substantially parallel to opposing edges of the rectangular perimeter.

The scope of the claims should not be limited by the embodiments set forth in the above examples, but should be given the broadest interpretation consistent with the description as a whole.

The invention claimed is:

1. A radiofrequency (RF) module, comprising:
- a primary board;
- a controller supported by the primary board; and
- an antenna assembly supported by the primary board and connected with the controller, the antenna assembly including:
  - an array of antenna elements, each antenna element having:
  - an active patch; and
  - a passive patch separated from the active patch by a slot, wherein:
    - the active patch and the passive patch include a set of edges defining a rectangular perimeter:
    - the slot extends from a first side of the rectangular perimeter to a second side of the rectangular perimeter; and
    - the slot includes (i) a central portion parallel with a first edge of the rectangular perimeter, and an outer portion that is non-parallel relative to the first edge of the rectangular perimeter;
  - wherein one of the active patch and the passive patch has a greater surface area than the other of the active patch and the passive patch.

2. The RF module of claim 1, wherein the slot extends from a first portion of a first side of the rectangular perimeter to a second portion of the first side.

3. The RF module of claim 2, wherein the active patch has a single edge on the rectangular perimeter, and at least one further edge inside the rectangular perimeter.

4. The RF module of claim 1, wherein the active patch has an edge that is colinear with an edge of the passive patch.

5. The RF module of claim 1, wherein the antenna assembly is integrated with the primary board.

6. The RF module of claim 1, wherein the primary board includes a plurality of layers; and
- wherein the active patch and the passive patch of each antenna element are contained in the same layer of the primary board.

7. The RF module of claim 1, wherein the active patch has a greater surface area than the passive patch.

8. The RF module of claim 1, wherein the antenna assembly further includes:
- a plurality of subarray dividers each connected with a respective subset of the antenna elements.

9. The RF module of claim 1, further comprising a communications interface on an upper surface of the primary board.

10. The RF module of claim 9, wherein the communications interface comprises a Universal Serial Bus (USB) interface.

* * * * *